United States Patent [19]
Westlake, Sr.

[11] Patent Number: 4,902,365
[45] Date of Patent: Feb. 20, 1990

[54] METHOD FOR MAKING A COMPOSITE SHEET-LIKE STRUCTURE

[76] Inventor: Edward F. Westlake, Sr., 116 Deerfield Rd., Broomall, Pa. 19008

[21] Appl. No.: 128,289

[22] Filed: Dec. 3, 1987

[51] Int. Cl.$^4$ .............................................. B32B 31/20
[52] U.S. Cl. ............................. 156/273.9; 156/275.1; 156/292; 156/308.4; 156/309.9; 428/116; 428/118
[58] Field of Search .................. 156/273.9, 275.1, 292, 156/308.4, 309.9; 428/116, 118

[56] References Cited

U.S. PATENT DOCUMENTS

| | | | |
|---|---|---|---|
| 2,985,968 | 5/1961 | Koch | 428/116 X |
| 3,257,260 | 6/1966 | Morgan | 428/118 |
| 3,664,906 | 5/1972 | Hartig | 428/118 X |
| 3,753,843 | 8/1973 | Hutchison | 428/116 |
| 4,208,228 | 6/1980 | Johansson | 428/116 X |
| 4,351,870 | 9/1982 | English, Jr. | 428/117 X |

Primary Examiner—Robert A. Dawson

[57] ABSTRACT

A contiguous planar composite sheet-like structure includes a pair of outwardly facing laminar thermoplastic sheets having generally planar outwardly and oppositely facing surfaces and a honeycomb inner core having axially elongated honeycomb cells with cell axes substantially perpendicular to the outwardly facing thermoplastic sheets, with the honeycomb inner core protruding into the laminar thermoplastic sheets sufficiently far that the honeycomb cells are securely retained by the thermoplastic sheets. A method for manufacturing the composite sheet-like structure encompasses heating either or both the thermoplastic and the honeycomb inner core and thereafter pressing these members together to effectuate the desired composite structure.

23 Claims, 2 Drawing Sheets

METHOD FOR MAKING A COMPOSITE SHEET-LIKE STRUCTURE

FIELD OF THE INVENTION

This invention relates generally to rigid, preferably planar structures and methods for making such structures.

BACKGROUND OF THE INVENTION AND DESCRIPTION OF THE PRIOR ART

Planar, sheet-like structures of the type currently used as partitions in restrooms are homogeneous solid structures formed of thermoplastic material, typically polyethylene. While structures currently used as restroom partitions function effectively, they are expensive to manufacture and do not resist defacing by users of the restrooms, particularly public restrooms. Cigarettes and other tobacco products, when urged against the partition structures in public restrooms leave unsightly marks requiring repainting or other repair. This is a substantial disadvantage with known, currently commercially used structures.

Concerning printed prior art, U.S. Pat. Nos. 3,565,746; 3,630,819, 3,637,459; 3,640,938; 3,753,843; 3,846,524; 3,884,646, 3,859,401; 3,936,565; 3,940,468; 3,940,526; 3,977,931; 4,013,810; 4,035,536; 4,053,545; 4,262,052; 4,301,216; 4,351,870; 4,440,825 and 4,543,289 are known to applicant. Of these patents, '843 is believed to be by far the most relevant.

'843 discloses a molded panel having plastic on two outwardly facing surfaces and a honeycomb-type interior core. The panel is molded and has a flowable, hardenable urethene-based plastic foam as the face material.

Also relevant are assertions set forth in '646 and '810, stating in substance that it is old in the art to use honeycomb as one component in composite structures.

'870 discloses interface junctions between cellular core material and outwardly facing sheets produced by thermal and/or pressured-induced adhesive bonds. However, '870 does not suggest use of metal or other high strength material as the cellular core, only suggesting using a strength-increasing metal layer, at column 3, line 65. '870 suggests that the interior material might be a foam or other hollow cellular material, at column 3, line 29.

The other patents noted are less relevant.

SUMMARY OF THE INVENTION

This invention provides a generally rigid, preferably planar, composite sheet-like structure and method for making the same where the structure includes a pair of outwardly facing preferably planar laminar thermoplastic sheets having generally planar outwardly and oppositely facing surfaces and a honeycomb inner core having axially elongated honeycomb cells, with the cell axes being substantially perpendicular to the outwardly facing thermoplastic sheets. The honeycomb inner core protrudes into the laminar thermoplastic sheets sufficiently far that the honeycomb cells are sealed by the plastic sheets and the sheet-like structure has essentially the resistance to flexure of the honeycomb inner core standing alone. The honeycomb is preferably a hexagonally structured cell honeycomb, formed of symmetrical open cells, which is preferably but not necessarily aluminum. The thermoplastic is preferably polyethylene or polypropylene; other thermoplastics may also be used.

The thermoplastic may be filled. Loaded thermoplastic sheets may also be used. These options provide a fire retardant structure. Also, while the honeycomb is preferably aluminum, materials such as steel, plastic, paper, fiber or any other material stiff enough to penetrate the thermoplastic sheets positioned on the outside of the honeycomb may be used as the honeycomb material.

The honeycomb protrudes into the thermoplastic sheet, preferably from at least about twenty percent to no more than about thirty percent of the thickness of the sheet. Similarly, most preferably no more than about ten percent of the thickness of the honeycomb protrudes into each of the thermoplastic sheets on either side of the honeycomb central core. This means that the honeycomb preferably protrudes into the thermoplastic sheets at least about twenty thousandths of an inch but preferably no more than about thirty thousandths of an inch.

The method aspect of the invention fabricates a substantially rigid, preferably planar composite sheet-like structure having a pair of outwardly facing laminar thermoplastic sheets, with preferably generally planar outwardly and oppositely facing surfaces, and having a honeycomb inner core including axially elongated honeycomb cells, with cell axes substantially perpendicular to the outwardly facing thermoplastic sheets. The honeycomb inner core preferably protrudes into the laminar thermoplastic sheets sufficiently far that the honeycomb cell structures are sealed by the plastic sheets and the composite sheet-like structure has essentially the resistance to flexure of the honeycomb inner core standing alone, with the thermoplastic sheets bondingly retaining the honeycomb. The outwardly facing laminar thermoplastic sheets may be filled with other materials to provide fire retardant properties.

The method aspect of the invention includes positioning the thermoplastic sheets on either side of the honeycomb inner core with the sheets generally parallel with the honeycomb inner core. In one practice of the method of the invention, heat is applied to the sides of the thermoplastic sheets facing oppositely from the sides which are proximate the honeycomb inner core. Heat is applied until surfaces of the sheet facing the honeycomb inner core have temperature preferably about equal to the glass transition point of the thermoplastic sheet material. Once this temperature is achieved, the thermoplastic sheets and the honeycomb inner core are pressed together until the honeycomb inner core penetrates the thermoplastic sheets sufficiently to produce an adequately rigid structure having sufficient structural strength. Generally this means that the honeycomb inner core penetrates the thermoplastic sufficiently far that the thermoplastic sheets seal the honeycomb cells. The sheets are cooled with the honeycomb protruding into the sheet surface until the thermoplastic solidifies around the honeycomb sufficiently to bond securely to the honeycomb.

In another practice of the method of the invention, heat is applied to the honeycomb inner core until the core is heated to a sufficient temperature that it will reasonably easily penetrate the laminar thermoplastic sheets positioned on either side of the core. The core is preferably heated until the core, or at least the outer surfaces of the core facing the thermoplastic sheets, reach a temperature at least equal to the glass transition point of the thermoplastic sheet material. Once this temperature is achieved, the thermoplastic sheets and the honeycomb inner core are pressed together until the honeycomb inner core penetrates the thermoplastic sheets sufficiently far to give sufficient rigidity and structural strength to the structure. This generally means that the honeycomb inner core has penetrated the thermoplastic sheets sufficiently far that the thermoplastic sheets may seal the honeycomb cells. The honeycomb inner core or the entire assembly is cooled, with the honeycomb protruding into the sheets, until the thermoplastic solidifies around the honeycomb sufficiently to securely bond to the honeycomb.

The thermoplastic sheets may be pressed against the honeycomb inner core until the honeycomb penetrates the sheets sufficiently far to produce a corresponding honeycomb or waffle-like pattern on the sheet outer surfaces which face oppositely to the surfaces penetrated by the honeycomb.

If the method of the invention in which the thermoplastic sheets are heated to fabricate the composite structure is practiced, the thermoplastic sheets are preferably heated by contact with platens at sheet surfaces facing oppositely from those contacting the honeycomb, with a first heat transfer fluid being circulated at elevated temperature through the platens, thereby transferring heat to the platens and increasing both the temperature of the platens and the temperature of the thermoplastic sheets contacting the platens. Cooling is provided by circulating a second heat transfer fluid, at temperature reduced from the glass transition temperature of the sheet material, through the the platens thereby decreasing temperature of the platens and of the thermoplastic sheets contacting the platens. Temperature of the first heat transfer fluid preferably exceeds the glass transition temperature of the sheet material. Similarly, temperature of the second heat transfer fluid is preferably a temperature at which the plastic sheet portion of the composite structure is rigid.

In the method of the invention whereby the honeycomb inner core is heated prior to contact with the thermoplastic sheets, the honeycomb inner core is preferably induction heated by application directly thereto of a voltage potential. If desired, the honeycomb inner core and the thermoplastic sheets may both be heated. In any event, the heated component or components of the assembly are preferably heated to a temperature exceeding the glass transition temperature of the sheet material.

Most preferably, when pressure is applied to force the honeycomb into the thermoplastic sheets so that the honeycomb cells are sealed by the sheets, the honeycomb is pressed sufficiently into the thermoplastic sheets that the resulting composite structure has essentially the resistance to flexure of the honeycomb standing alone.

In every case, thermoplastic sheets are heated until sheet surfaces facing the honeycomb, and contiguous interior sheet portions of thickness equal to the depth that the honeycomb penetrates the sheet, are sufficiently softened to permit the honeycomb to penetrate the sheets sufficiently that the sheets tightly retain the honeycomb when cooled to room temperature. Force applied to urge the honeycomb and the thermoplastic sheets together is less than buckling limit of the honeycomb.

BRIEF DESCRIPTION OF THE DRAWINGS

In the drawings, parts bearing reference numerals using ', '', ''', etc. notation are functionally equivalent to parts having identical reference numerals but lacking such ', '', ''', etc. notation.

DESCRIPTION OF THE PREFERRED EMBODIMENTS AND BEST MODE KNOWN FOR PRACTICING THE INVENTION

Figure 1:
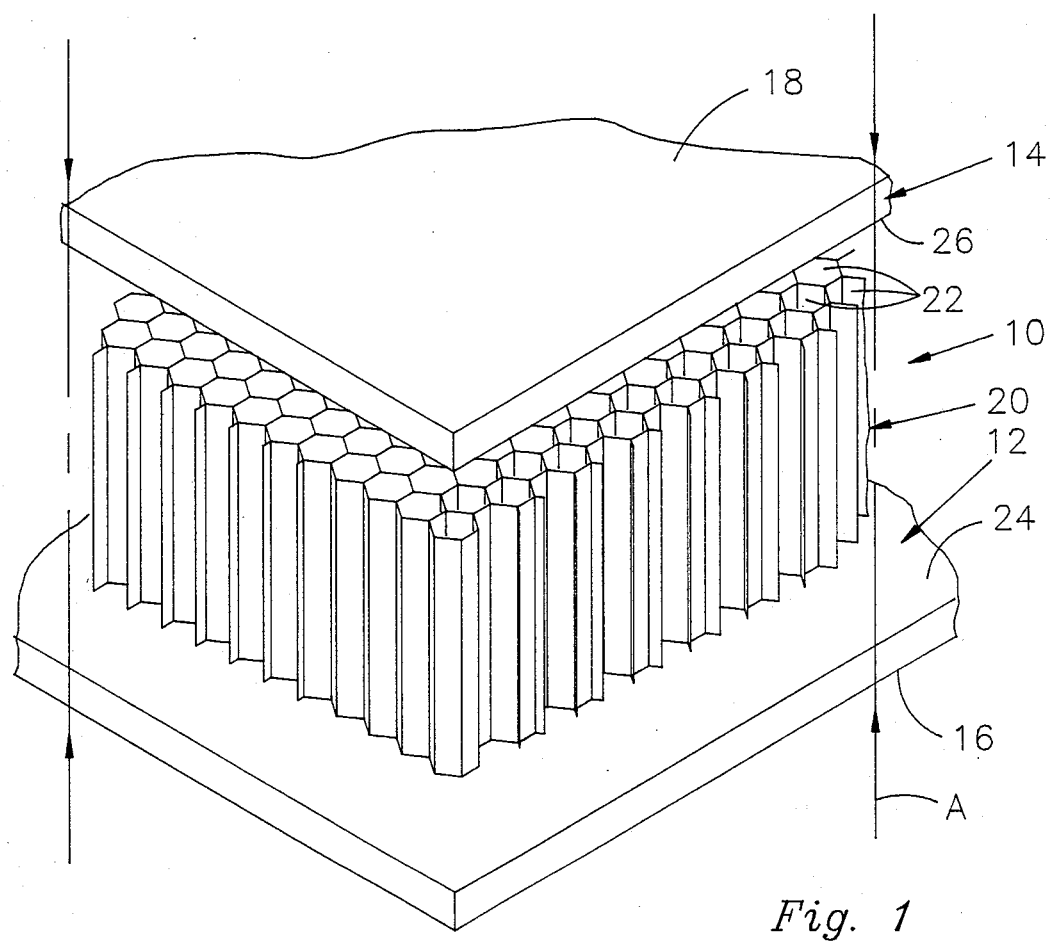
FIG. 1 is a broken isometric view of component parts which are assembled to form a composite sheet manifesting aspects of the invention.
Figure 2:
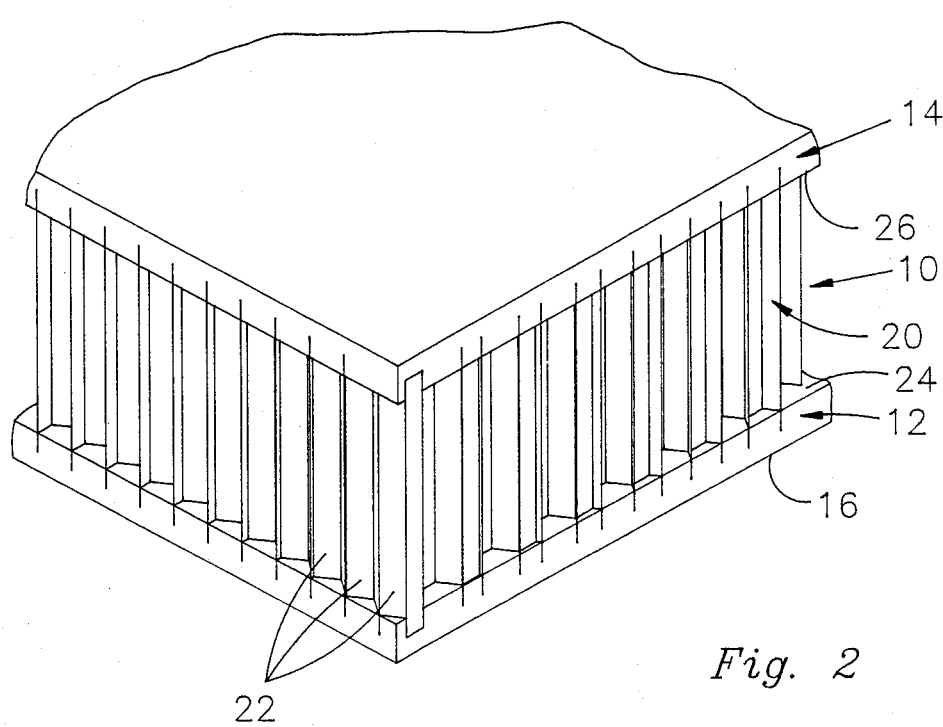
FIG. 2 is a broken isometric view of a rigid, preferably planar, composite sheet-like structure embodying aspects of the invention.
Figure 3:
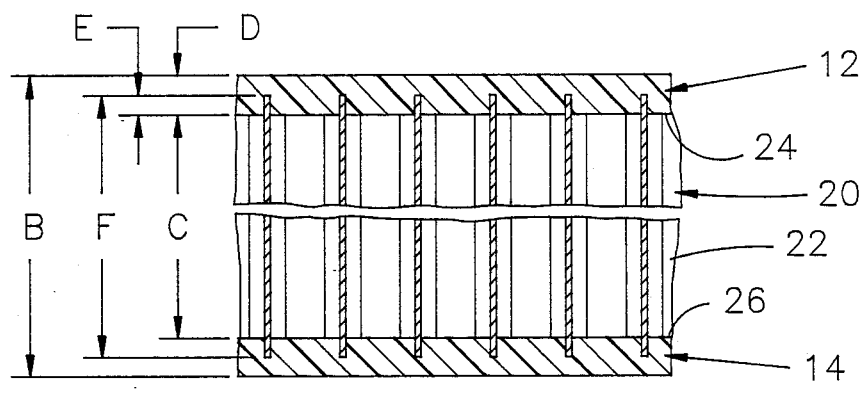
FIG. 3 is a schematic sectional view illustrating various dimensional aspects of a preferred embodiment of a rigid, preferably planar, composite sheet-like structure manifesting aspects of the invention.

A rigid, planar composite sheet-like structure generally embodying the invention is designated generally 10 in FIGS. 1, 2 and 3 and includes a pair of outwardly facing laminar thermoplastic sheets designated generally 12, 14, having generally planar outwardly and oppositely facing surfaces designated generally 16, 18 respectively. A honeycomb inner core 20 has axially elongated honeycomb cells designated generally 22 with cell axes disposed generally perpendicularly to outwardly facing thermoplastic sheets 12, 14. The honeycomb inner core 20 preferably protrudes into sheets 12, 14 sufficiently far that honeycomb cells 22 are essentially sealed by plastic sheets 12, 14. This provides structure 10 with essentially the resistance to flexure, in a direction transverse to the axes of honeycomb cells 22, which is the same as the resistance to flexure of the honeycomb inner core 20 when standing alone. Even if honeycomb inner core 20 does not protrude in sheets 12, 14 sufficiently far that honeycomb cells 22 are sealed by plastic sheets 12, 14, honeycomb inner core 20 protrudes into sheets 12, 14 sufficiently to provide the desired degree of rigidity in the resulting composite structure. If a non-rigid structure is desired, the structure can be fabricated with the honeycomb inner core 20 protruding only slightly into sheets 12, 14 and only sufficiently far that honeycomb inner core 20 is securely held by sheets 12, 14 so that the composite structure can bend as required. However, a highly rigid structure is the preferred mode for practice of the invention.

Cells 22 of honeycomb inner core 20 are preferably hexagonally configured with the hexagonal shape extending in the direction of the cell axes, generally perpendicular to sheets 12, 14, as illustrated in FIG. 1. Cells 22 are preferably axially symmetrical, as illustrated in FIG. 1, and are open at their ends before sheet-like structure 10 is fabricated. Honeycomb inner core 20 is preferably aluminum. However, other suitable honeycomb materials, such as steel, fiber, paper, plastic and the like may also be used, depending on cost factors and design requirements for the composite sheet-like structure.

Thermoplastic sheets 12, 14 are preferably polyethylene or polypropylene; however, any suitable thermoplastic may be used.

As illustrated in FIGS. 2 and 3, honeycomb inner core 20 preferably protrudes into surfaces 24, 26 (of sheets 12, 14) which face oppositely from outwardly facing surfaces 16, 18, sufficiently far that cells 22 are sealed by sheets 12, 14 at respective ends of cells 22. Axes of cells 22 extend generally parallel to lines A in FIG. 1. Arrows on lines A in FIG. 1 illustrate the direction in which sheets 12, 14 are urged towards one another when structure 10 is fabricated.

Referring specificaly to FIG. 3 in which the rigid planar composite sheet-like structure is shown in section with dimensional figures, in one preferred embodiment the structure has thickness, indicated by dimension B, of 0.930 inches. Thermoplastic sheets 12, 14 have each been 0.118 inches thick, as indicated by dimension D, and have been separated by about 0.694 inches, as indicated by dimension C, between surfaces 24 and 26 in FIG. 3. Honeycomb inner core 20 has been 0.75 inches thick, indicated by dimension F, and has protruded into thermoplastic sheets 12, 14 about 0.25 inches, indicated by dimension E in FIG. 3.

Most preferably, honeycomb inner core 20 protrudes into thermoplastic sheets 12, 14 a distance of at least about twenty thousandths (0.020) of an inch but no more than about thirty thousandths (0.030) of an inch. Furthermore, preferably at least about 5% but no more than about 10% of the length or thickness of honeycomb inner core 20 protrudes into each of the thermoplastic sheets. This means that the honeycomb inner core preferably protrudes into the thermoplastic sheet at least about 20% of the thickness of the sheet but no more than about 30% of the thickness of the sheet.

Figure 4:
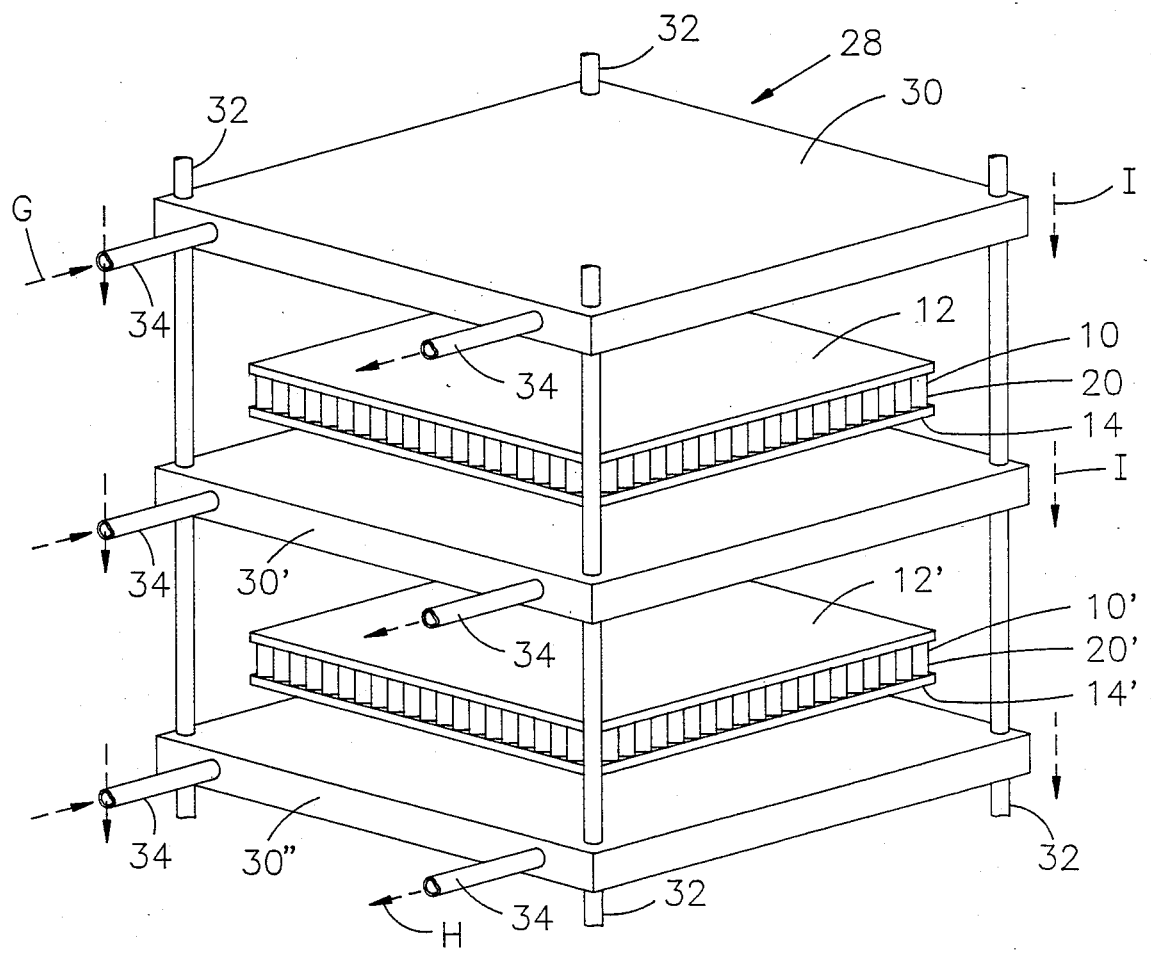
FIG. 4 is an schematic isometric drawing illustrating aspects of the invention.

One method aspect of the invention whereby the rigid planar sheet-like structure embodying the invention may be fabricated is schematically in FIG. 4, where several of the rigid, planar sheet-like structures designated 10, 10' are illustrated. Structures 10, 10' have thermoplastic sheets 12, 14 and honeycomb inner cores 20, as indicated previously.

In this method for fabricating the structure, thermoplastic sheets 12, 12', 14, 14' are positioned on either side of honeycomb inner cores 20, 20', generally parallel with the honeycomb inner cores. The sandwich defined by the plastic sheets 12, 14 and the honeycomb inner core 20 is positioned within a schematically illustrated press, designated generally 28 in FIG. 4. Press 28 includes a number of platens 30, 30', 30" moveable vertically along rods designated generally 32 in FIG. 4. Platens 30 have conduits 34 running therethrough so that upon passage of heat transfer fluid through the interiors of platens 30 via conduits 34, the temperature of platens 30, 30', 30" may be raised or lowered, as desired. Heat transfer fluid generally enters conduits 34 as indicated by arrows G in FIG. 4 and exits conduits 34 as indicated by arrows H in FIG. 4.

Means, preferably hydraulic piston-cylinder combinations, are provided (but not illustrated in FIG. 4) for moving platens 30 so that platens 30 converge with predetermined and controlled force towards and away from one another, as indicated generally by arrows I in FIG. 4. While these means are not illustrated, any suitable means, such as the preferred hydraulic piston cylinder combinations, may be utilized to move platens 30 along rods 32.

After thermoplastic sheets 12, 14 are positioned on either side of honeycomb inner core 20, platens 30 are moved towards one another until respective platens 30, 30' contact opposite outwardly facing surfaces 16, 18 of sheets 12, 14. Suitable heat transfer fluid, typically pressurized steam, is introduced into platens 30 via conduits 34 thereby heating platens 30 and hence the outwardly facing surfaces of 16, 18 of sheets 12, 14. The heat transfer fluid, having sufficiently high temperature, is circulated through conduits 34 thereby continuing application of heat to the outwardly facing surfaces 16, 18 of thermoplastic sheets 12, 14 until inwardly facing surfaces 24, 26 (of sheets 12, 14) which facingly contact honeycomb inner core 20, have temperature about equal to the glass transition point of the thermoplastic material of sheets 12, 14.

Once inwardly facing surfaces 24, 26 have reached such glass transition point temperature, platens 30, 30' on either side of sheets 12, 14 are urged towards one another by the force application means. This presses thermoplastic sheets 12, 14 against honeycomb inner core 20, preferably until core 20 has penetrated sheets 12, 14 sufficiently far that sheets 12, 14 seal honeycomb cells 22 of core 20. Once sealing is complete and the honeycomb has penetrated the thermoplastic sheets to a desired extent, flow of the first heat transfer fluid through conduits 34 is stopped, if this has not been done previously. Preferably, a second heat transfer fluid, having temperature below the solidification temperature of thermoplastic sheets 12, 14, is circulated through heat transfer conduits 34 until sheets 12, 14 have cooled and solidified around honeycomb inner core 20 sufficiently to securely bond to the honeycomb.

Platens 30, 30' on either side of sheets 12, 14 may be operated to press thermoplastic sheets 12, 14 against honeycomb inner core 20 only until core 20 penetrates sheets 12, 14 by a desired, predetermined amount which is less than the amount required to seal the honeycomb cells of core 20. This may be desirable if a flexible structure is to be constructed.

Pressure may be applied to sheets 12, 14 via platens 30, 30' so that honeycomb inner core 20 penetrates sheets 12, 14 sufficiently far to produce a corresponding honeycomb or waffle-like pattern on sheet surfaces 16, 18 facing outwardly respecting honeycomb inner core 20. If such a honeycomb or waffle-like pattern is desired on outwardly facing surfaces 16, 18, it is helpful to place a slightly compressible sheet-like material between outwardly facing surfaces 16, 18 and respective platens 30, 30'. Mylar sheet may be used.

In another aspect of the invention, the thermoplastic sheets, 12, 12', 14, 14' are positioned on either side of honeycomb inner cores 20, 20', generally parallel with the honeycomb inner cores. The sandwich defined by plastic sheets 12, 14 and a honeycomb inner core 20 is positioned within a press such as that illustrated in FIG. 4. In this method, the honeycomb inner core 20 is heated, preferably by application of electrical voltage thereto, to a suitably high temperature that the honeycomb inner core 20 penetrates the thermoplastic sheets 12, 14 when the thermoplastic sheets are urged thereagainst. If this method is used, it is not necessary to utilize a press having capability for circulating heat transfer fluid through the platens, such as is illustrated in FIG. 4. In this method, while it is preferred to heat the honeycomb inner core by application of voltage, heating the honeycomb inner core by radiant heat and the like is also within the purview of the invention. Heat may be applied to thermoplastic sheets 12, 14 by circulating heat transfer fluid through platens 30, 30' while honeycomb inner core 20 is also being heated.

When thermoplastic sheets 12, 14 are heated by contact with platens 30, 30' it is important that the sheets be heated until interior portions of sheets 12, 14, bounded by surfaces 24, 26 and having thickness of at least equal to the thickness of the sheet which is penetrated by honeycomb 20, reach the glass transition point, or nearly the glass transition point, of the thermoplastic sheet material.

For efficient operation of the press, the first heat transfer fluid should be at a temperature elevated somewhat above the glass transition temperature of the thermoplastic material, to provide sufficiently rapid heating of the portions of thermoplastic sheets proximate inwardly facing surfaces 24, 26. Likewise, the second heat transfer fluid should be at a temperature substantially reduced from the glass transition point of the plastic sheet material, preferably at a temperature at which the plastic sheet material is rigid.

It is further preferable that platens 30, 30' continue pressing together the composite structure (consisting of the thermoplastic sheets 12, 14 and honeycomb inner core 20) while the second cooling fluid is circulating through platens 30, 30' and is thereby cooling platens 30, 30' and sheets 12, 14.

Force may be applied to the platens to cause the honeycomb inner core 20 to penetrate sheets 12, 14 sufficiently far that the resulting composite structure is highly rigid, with rigidity corresponding substantially to that of the honeycomb standing alone. Dimensions of the structure may be selected and materials may be selected so that a structure having a preselected thickness, indicated by dimension B in FIG. 3, results. Platens 30, 30' should be urged together with force less than the buckling limit of the honeycomb inner core, as the honeycomb inner core penetrates sheets 12, 14. A higher force may be initially applied so long as inwardly facing surfaces 24, 26 of sheets 12, 14, and portions of sheets 12, 14 contiguous thereto, are essentially at or higher than the glass transition temperature of the thermoplastic material. Once the honeycomb penetrates the plastic sheet material and begins to encounter resistance to further penetration, the force applied to the honeycomb should be less than the honeycomb buckling limit. Of course, the hotter the plastic, (i.e. when the temperature is approaching and/or above the glass transition point) the less resistance encountered by the honeycomb and the greater the force that may be applied.

In one preferred practice of the invention, the platens have been sixty (60) inches by one hundred twenty (120) inches and have been used to manufacture a composite structure forty-eight (48) inches by ninety-six (96) inches. The press has utilized cylinders thirty (30) inches in diameter. Pressures on the pistons in the cylinders during heating have been from about 900 to about 1200 psi with about 1,000 psi having been found to be an optimum pressure during the heating cycle. During cooling, pressure on the pistons has been from about 1200 to about 1600 psi with an optimum pressure having been about 1500 psi. Five cylinders have been used, one at each corner of the press, essentially aligned with rods 32 illustrated in FIG. 4, and the fifth cylinder at the center of the press to apply force to the centers of the platens. With this arrangement the pressure applied to the thermoplastic sheets has ranged from about 6.89 psi to about 9.20 psi during heating and from about 9.20 psi to about 12.26 psi during cooling. These preferred pressures and pressure ranges have been utilized when the thermoplastic sheets have been polyethylene and the honeycomb inner core has been aluminum.

When the composite structure is manufactured utilizing the preferred polyethylene or polyproplyene as the sheet material and the preferred aluminum as the honeycomb core material, the heat conducting properties of the honeycomb aluminum core make the structure highly resistant to damage when cigarettes and the like are pressed thereagainst, as is often the case in public restrooms. This is a significant and substantial advantage over structures used heretofore as restroom partitions. Moreover, if a suitable fire retardant is blended with the polyethylene, polypropylene or other thermoplastic material, the resulting composite structure is essentially fireproof. This is a further advantage over the restroom partitions used heretofore.

While aluminum is the preferred material for the honeycomb inner core, steel, plastic, fiber, paper or any other suitable material may also be used, so long as the material is stiff enough to penetrate the thermoplastic sheets on either side of the material. If plastic, fiber or paper is used, heating will generally be compared to heating the thermoplastic sheets; when made of plastic, fiber or paper the honeycomb will generally be unheatable.

While the invention has been described with emphasis on manufacture of a rigid, planar composite sheet-like structure principally adapted for use in public restroom facilities, it is to be understood that the composite sheet-like structures have a wide variety of applications in light of the high strength-to-weight ratio of the structures.

I claim the following:

1. A method for fabricating a rigid planar composite sheet-like structure having a pair of outwardly facing laminar thermoplastic sheets with generally planar outwardly and oppositely facing surfaces and a honeycomb inner core having axially elongated honeycomb cells with cell axes and cell walls substantially perpendicular to said outwardly facing thermoplastic sheets, with said honeycomb inner core protruding into said laminar thermoplastic sheets sufficiently far that said honeycomb cell walls are retained by said plastic sheets and said composite sheet-like structure has essentially the resistance to flexure of said honeycomb inner core standing alone, comprising:
    a. positioning said thermoplastic sheets on either side of said honeycomb inner core and generally parallel thereto;
    b. applying heat to sides of said thermoplastic sheets facing oppositely from said sides which are proximate said honeycomb inner core until said surfaces of said sheet facing said honeycomb inner core have temperature about equal to the glass transition point of said material of said thermoplastic sheets;
    c. pressing said thermoplastic sheets against said honeycomb inner core until said honeycomb inner core cell walls have penetrated said thermoplastic sheets by moving substantially perpendicular to said planar facing surfaces and sufficiently far that said thermoplastic sheets retain said honeycomb cells when said thermoplastic sheets are cooled to room temperature.

2. The method of claim 1 further comprising the step of cooling said sheets with said honeycomb protruding into surfaces thereof until said thermoplastic has solidified around said honeycomb sufficiently to securely bond to said honeycomb.

3. The method of claim 1 wherein said pressing is performed at least until said honeycomb inner core has penetrated said thermoplastic sheets sufficiently to seal said honeycomb cells.

4. The method of claim 1 further comprising pressing said thermoplastic sheets against said honeycomb inner core until said honeycomb inner core penetrates said sheets sufficiently far to produce a corresponding pattern on sheet surfaces facing oppositely to the sheet surfaces penetrated by said honeycomb.

5. The method of claim 1 further comprising heating said thermoplastic sheets until said sheet surfaces facing said honeycomb and interior portions of said sheets bounded by said sheet surfaces facing said honeycomb and penetrated by said honeycomb when said thermoplastic sheets are pressed against said honeycomb inner core are at said glass transition point of said sheet material.

6. The method of claim 1 wherein said heating further comprises contacting said thermoplastic sheets with platens at sheet surfaces opposite those contacting said honeycomb and circulating a first heat transfer fluid at elevated temperature through said platens thereby transferring heat to said platens and increasing the temperature thereof and of said thermoplastic sheets contacting said platens.

7. The method of claim 1 wherein said cooling further comprises circulating a second heat transfer fluid at temperature reduced from said glass transition temperature of said sheet material through said platens thereby gathering heat from said platens and decreasing the temperature thereof and of said thermoplastic sheets contacting said platens.

8. The method of claim 1 wherein said elevated temperature of said first heat transfer fluid exceeds said glass transition temperature of said sheet material.

9. The method of claim 1 wherein said reduced temperature of said second heat transfer fluid is a temperature at which said plastic sheet material of said composite structure is rigid.

10. The method of claim 2 wherein said pressing is continued while said cooling is performed.

11. A method for fabricating a rigid planar composite structure having a pair of outwardly facing thermoplastic sheets with generally planar outwardly and oppositely facing surfaces and a honeycomb inner core having axially elongated cells with cell axes and cell walls substantially perpendicular to said outwardly facing thermoplastic sheets, with said honeycomb inner core protruding into said thermoplastic sheets sufficiently far that said honeycomb cells are sealed by said plastic sheets, said honeycomb is retained by said plastic sheets and said composite structure has essentially the resistance to flexure of said honeycomb inner core when standing alone, comprising:

a. positioning said thermoplastic sheets on either side of said honeycomb and generally parallel thereto;

b. applying heat to said thermoplastic sheets until said surfaces of said sheets facing said honeycomb and contiguous interior sheet portions of thickness equal to the depth to which said honeycomb penetrates said sheet soften sufficiently to permit said honeycomb cell walls to penetrate said sheets substantially perpendicular to said planar facing surfaces and sufficiently far that said sheets rigidly retain said honeycomb when said sheets are cooled to room temperature and said resulting composite structure has resistance to bending at least that of the honeycomb inner core when standing alone, after said honeycomb and said thermoplastic sheets are urged together with force less than the buckling limit of said honeycomb;

c. pressing said thermoplastic sheets with a force of between about 6.89 and 9.20 psi against said honeycomb in a direction parallel to said honeycomb cell walls until said honeycomb penetrates said thermoplastic sheets, by moving in a direction parallel with the walls of said honeycomb cells, sufficiently far that said thermoplastic sheets seal said honeycomb cells and said sheets sufficiently rigidly retain said honeycomb when said sheets are cooled to room temperature that said resulting composite structure has resistance to bending at least that of the honeycomb inner core when standing alone.

12. A method for simultaneously bonding a planar thermoplastic sheet to a honeycomb having axially elongated cells with cell axes and cell walls substantially perpendicular to said thermoplastic sheet and sealing ends of said cells with said thermoplastic sheet, comprising:

a. applying heat to said thermoplastic until a sheet surface facing said honeycomb and a contiguous interior sheet portion substantially approach glass transition temperature of said thermoplastic and thereby soften sufficiently to permit said honeycomb to penetrate said sheet to a depth sufficient that said sheet bondingly retains said honeycomb when said sheet is cooled substantially below said glass transition temperature, when said honeycomb and said thermoplastic sheet are urged together with force less than buckling limit of said honeycomb;

b. pressing said thermoplastic sheets with a pressure of between about 6.89 and 9.20 psi applied in a direction parallel to said honeycomb cell walls against a honeycomb surface having open cell ends until said honeycomb cell walls move in a direction parallel to themselves and perpendicular to said thermoplastic and penetrate said sheet by moving substantially perpendicular to said planar facing surfaces sufficiently far that said thermoplastic sheet seals said honeycomb cells and bondingly retains said honeycomb when said sheet is cooled substantially below said glass transition temperature; and c. cooling said sheet portions penetrated by said honeycomb to a temperature, substantially below said glass transition temperature, at which said honeycomb bondingly retains said sheet.

13. A method for fabricating a rigid composite structure having outwardly facing thermoplastic sheets and a honeycomb inner core having open cells with cell walls substantially perpendicular to the thermoplastic sheets, with said honeycomb inner core protruding into said thermoplastic sufficiently far that said honeycomb cells are sealed by said plastic and said structure has essentially the resistance to flexure of said honeycomb standing alone, comprising:

a. positioning said thermoplastic on either side of said honeycomb;

b. applying heat to said thermoplastic until surfaces facing said honeycomb and contiguous interior portions of thickness equal to the depth to which said honeycomb penetrates said plastic soften sufficiently to permit said honeycomb to penetrate said plastic sufficiently to retain said honeycomb when cooled to solidification temperature;

c. pressing said thermoplastic in a direction essentially parallel to the honeycomb cell walls on either side of said honeycomb against said honeycomb until said honeycomb cell walls penetrate said thermoplastic by travelling in a direction substantially perpendicular to said planar thermoplastic a distance equal to about 5–10% of the axial thickness of said honeycomb, thereby penetrating said thermoplastic by an amount equal to about 20–30% of the thickness of said thermoplastic such that exteriorly facing surfaces of said thermoplastic are a preselected distance apart;

d. cooling said thermoplastic substantially to said solidification temperature while continuing pressing said thermoplastic against said honeycomb.

14. A method for fabricating a rigid composite structure having outwardly facing thermoplastic sheets and a porous inner core having at least some open inner core pores with said inner core protruding into said thermoplastic sufficiently far that exteriorly facing pores in the inner core are retained by said plastic and said structure has essentially the resistance to flexure of said inner core standing alone, comprising:

a. positioning said thermoplastic sheets on either side of said inner core;

b. heating said inner core by application of electrical voltage thereto until surfaces thereof facing said thermoplastic sheets and contiguous inner portions of said inner core, of thickness equal to depth to which said inner core penetrates said thermoplastic, to at least the glass transition temperature of said thermoplastic to permit said inner core to penetrate said thermoplastic sufficiently so that said inner core is retained by said thermoplastic when said thermoplastic has solidified; and c. pressing said thermoplastic on either side of said inner core until said inner core penetrates said thermoplastic by said distance sufficient to permit said thermoplastic to retain said inner core when said thermoplastic solidifies.

15. The method of claim 14 further comprising applying heat to said thermoplastic until surfaces facing said inner core and contiguous interior portions of thickness equal to the depth to which said inner core penetrates said thermoplastic soften sufficiently to permit said inner core to penetrate said thermoplastic sufficiently to retain said inner core when cooled to solidification temperature.

16. The method of claim 1 wherein force applied to said sheets decreases with time.

17. The method of claim 10 wherein pressure of between about 9.20 and 12.26 psi is applied to said sheets.

18. The method of claim 1 further comprising heating said inner core by applying electrical voltage thereto.

19. The method of claim 1 further comprising heating said inner core radiantly.

20. A method for fabricating a rigid composite structure having outwardly facing thermoplastic sheets and a porous inner core having at least some open inner pores, with said inner core protruding into said thermoplastic sufficiently far that exterior pores in the inner core are retained by said plastic and said structure has essentially the resistance to flexure of said inner core standing alone, comprising:

a. positioning said thermoplastic sheets on either side of said inner core;

b. heating said inner core by application of radiant heat thereto until surfaces thereof facing said thermoplastic sheets and contiguous inner portions of said inner core of thickness equal to depth to which said inner core penetrates said thermoplastic, to at least the glass transition temperature of said thermoplastic to permit said inner core to penetrate said thermoplastic sufficiently so that said inner core is retained by said thermoplastic once said thermoplastic had solidified; and c. pressing said thermoplastic on either side of said inner core until said inner core penetrates said thermoplastic by said distance sufficient to permit said thermoplastic to retain said inner core when said thermoplastic solidifies.

21. The method of claim 1 wherein said pressing is insufficient to cause said honeycomb to buckle.

22. A method for fabricating a composite structure having outwardly facing thermoplastic sheets and a porous honeycomb inner core having honeycomb cells with axes perpendicular to said thermoplastic sheets, comprising:

a. positioning said thermoplastic sheets on either side of said honeycomb, abutting outwardly facing honeycomb cells;

b. heating said thermoplastic until portions thereof facing said honeycomb cells having thickness equal to depth to which said honeycomb penetrates said thermoplastic reach at least glass transition temperature of said thermoplastic, permitting said honeycomb to penetrate said thermoplastic sufficiently that said honeycomb is sufficiently tightly retained by said thermoplastic upon solidification that the resultant composite structure has essentially the resistance to flexure of the honeycomb standing alone; and c. pressing said thermoplastic sheets on either side of said honeycomb in a direction parallel to axes of said honeycomb cells until said honeycomb penetrates said sheets sufficiently that said sheets retain said honeycomb to a degree that the resultant composite structure has essentially the resistance to flexure of the honeycomb alone.

23. The method of claim 22 wherein said pressing is performed with force insufficient to buckle said honeycomb but sufficient in a direction parallel to axes of said honeycomb cells to drive said honeycomb cells into said thermoplastic sheets parallel to axes of said honeycomb cells to a depth of honeycomb penetration of said sheets sufficient that said sheets retain said honeycomb to a degree that the resultant composite structure has essentially the resistance to flexure of the honeycomb alone.

* * * * *